United States Patent [19]

Maier et al.

[11] Patent Number: 4,785,392

[45] Date of Patent: Nov. 15, 1988

[54] ADDRESSING MULTIPLE STORAGE SPACES

[75] Inventors: Robert M. Maier; John C. Andoh; Arno S. Krakauer, all of San Jose; Richard J. Tobias, Palo Alto; Allan J. Zmyslowski, Sunnyvale, all of Calif.

[73] Assignee: Amdahl Corporation, Sunnyvale, Calif.

[21] Appl. No.: 918,491

[22] Filed: Oct. 14, 1986

[51] Int. Cl.⁴ ............................................. G06F 12/00
[52] U.S. Cl. ................................................. 364/200
[58] Field of Search ... 364/200 MS File, 900 MS File

[56] References Cited

U.S. PATENT DOCUMENTS 4,503,501 3/1985 Coulson et al. ................. 364/200 X Primary Examiner—Raulfe B. Zache
Attorney, Agent, or Firm—Fliesler, Dubb, Meyer & Lovejoy

[57] ABSTRACT

In a data processing apparatus, having a user domain with domain storage space and an emulation domain with emulation storage space, emulates an instruction in the user domain by calling a program of instructions in the emulation domain. An instruction register connected to receive the sequence of instructions is partitioned into a plurality of fields. At least one field of the instruction register identifies a location for address information for an operand used in execution of the instruction. The instruction is decoded to generate a control code. The control code includes a branch signal to call the emulation program and a domain access control signal to indicate whether the emulation program requires access to the user domain storage base for execution. During execution of the emulation routine, domain access is implied by the location identified for the address information—a set of locations having been preselected as address registers for implied domain addressing.

30 Claims, 7 Drawing Sheets

FIG.—1

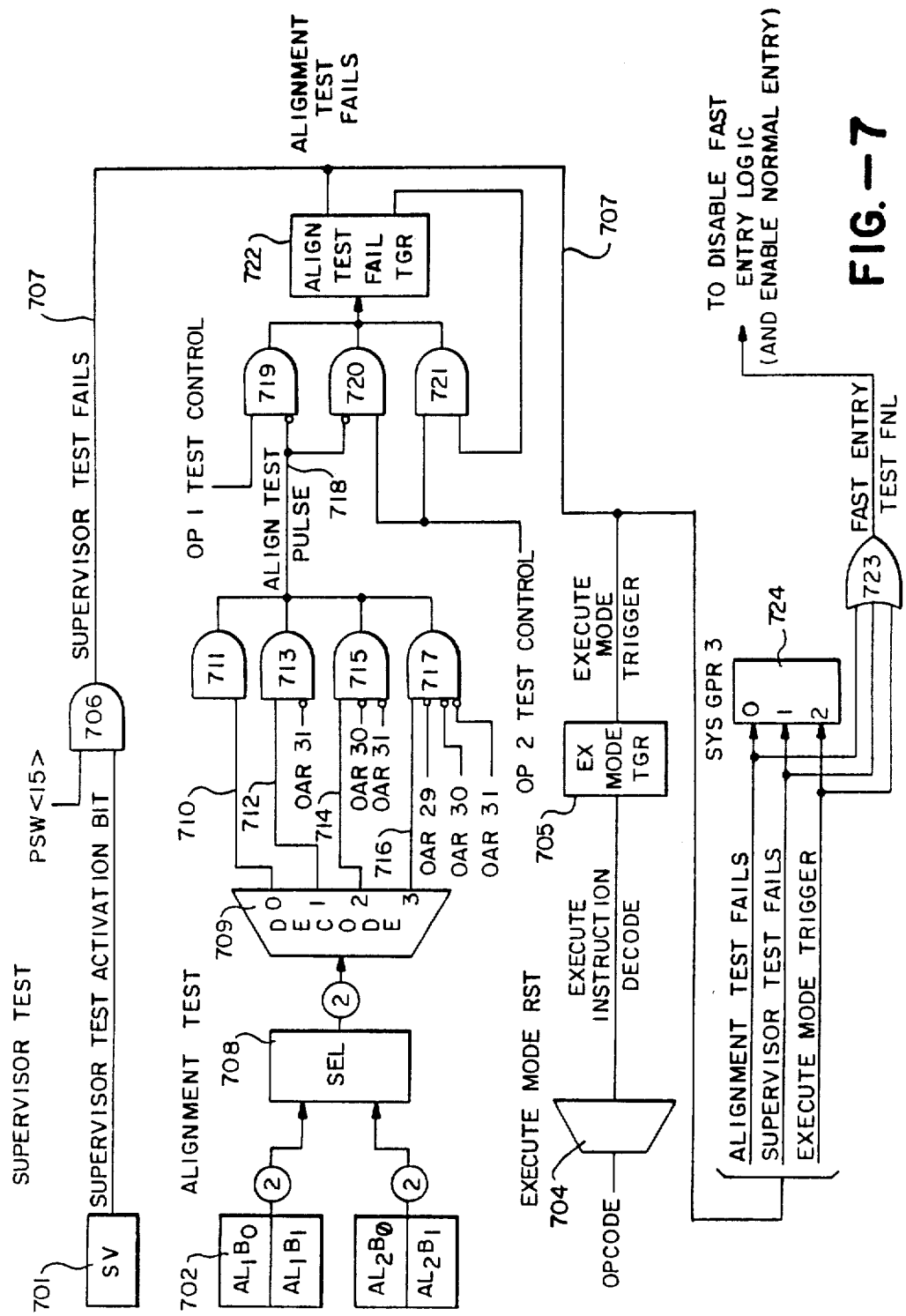
FIG.—7

ADDRESSING MULTIPLE STORAGE SPACES

FIELD OF THE INVENTION

The present invention relates to data processing machines that run with system control programs implementing logical processors. Each logical processor is assigned a domain including storage space and related facilities in the data processing machine. The present invention in particular relates to the accessing of domain storage space.

BACKGROUND OF THE INVENTION

Modern high speed data processing machines are being adapted for multi-user environments. One approach for adapting a single machine to a multi-user environment involves assigning a logical processor to each user. The logical processor behaves as if it had access to the full facilities of the data processing machine while system control confines the access of the logical processor to a specified domain of storage space and related hardware. In this manner, the various logical processors in a single machine do not overlap in storage. However, to simplify the user interface, the restricted access of the logical processor is transparent to that processor. Thus, instructions and addresses running in the machine do not specify a particular domain within which they are to be executed or used for accessing data.

A domain is a processing environment which consists of main storage, channels, operator facilities and logical processors that execute instructions. When activated in a preferred embodiment, a domain has the facilities described in the IBM System/370 Principles of Operation, or the IBM System/370 Extended Architecture Principles of Operation. These resources are controlled by a system control program and are collectively called the domain of the program.

When a system control program takes over in a machine, its domain is activated by macrocode, allocating the amount of storage, the number of channels and logical processors required. The system control programs and macrocode allocating a domain operate in a machine state called control state. Control state has dedicated main storage called system storage which is addressed with system addresses.

Programs run in a logical processor, known as domain programs, operate in a machine state called user state. The main storage allocated to a domain is called domain storage and domain storage accesses use domain addresses.

At times it is necessary for a program running in control state to access data stored in domain storage. This occurs, for instance, during emulation as discussed below.

A data processing machine is designed to implement a set of instructions known as machine instructions. After the architecture of the machine is defined, it is often desirable to implement instructions other than those in the machine set. This is accomplished by storing an emulation program of instructions in system storage that can be run in control state to emulate a new instruction.

When an instruction to be emulated is encountered by a logical processor, a branch to the control state is taken and the instruction is emulated.

Upon branch to the control state, it is necessary to test for program exceptions that apply to the emulation routine to be run in the control state. These tests take several lines of code in the emulation program and result in a decrease in performance of emulated instructions.

Also, in order to emulate some instructions, it is necessary for the emulation program in system storage running in the control state to access operands or other data stored in domain storage.

As discussed above, the instructions and addresses generated by logical processors do not specify whether a particular address is to be treated as a domain address or a system address.

In order to provide for this domain crossing during emulation, the prior art specified special instructions for emulation that operated in the control state and provided for access to domain storage. However, this implementation of special instructions resulted in only a limited number of instructions that could implement the domain crossing access and was costly to implement.

SUMMARY OF THE INVENTION

The present invention provides a new technique called implied domain addressing to differentiate between domain storage accesses and system storage accesses using existing instruction formats.

In one aspect, the present invention is a data processing apparatus, having a user domain with domain storage space and an emulation domain with emulation storage space, for processing a sequence of instructions. The sequence of instructions includes an instruction in the user domain that calls an emulation program of instructions in the emulation domain. The apparatus comprises an instruction register connected to receive the sequence of instructions, including a plurality of fields. At least one field of the instruction register identifies a location for address information for an operand used in execution of the instruction. Decoding means, connected to receive the instruction to be emulated, decodes the instruction to generate a control code. The control code includes a branch signal to call the program of instruction in the emulation domain and a domain access control signal to indicate whether the program of instructions in the emulation domain requires access to the user domain storage space for execution.

In response to the branch signal, the program of instructions from the emulation domain is supplied in sequence to the instruction register. In response to the domain access control signal and the location identified in the one field in the instruction register, a user domain access signal is generated indicating whether, for each instruction in the sequence, access to the user domain is required.

Addressing means in the data processing apparatus in communication with the instruction register, supplies an address for an operand stored in a storage means. The storage means, connected to receive the user domain access control signal and the operand address, stores operands from the user domain and the emulation domain at locations identified by the addresses. The addresses are translated in storage means in control state normally as emulation domain addresses. However, a means according to the present invention is included that is responsive to the user domain access signal for translating the address as a user domain address.

In another aspect, the present invention is a data processing apparatus as outlined above in which testing for program exceptions upon entry to an emulation program is accomplished quickly upon branch to the control state. The decoding means is responsive to the instruction to be emulated to generate a control code that includes a branch signal and a branch test signal. In means response to the branch signal for branching program control of the apparatus to the second or emulation state to enter a fast program for emulating the instruction. A means receiving the branch test signal tests for program exceptions upon branch to the emulation state apart from the fast program entered upon branch to emulation state. Upon detection of a program exception, an additional branch to an alternate program of instructions to handle the program exceptions and special cases is taken. In this manner, entry into an emulation program occurs quickly and emulation proceeds efficiently. Only upon detection of a program exception is a more cumbersome entry to the emulation program required.

With implied domain addressing, the instruction set capable of use in accessing domain storage during emulation of an instruction in a control state is extended to include essentially all instructions which are capable of accessing system storage. With the addition of fast testing for program exceptions, emulation performance is greatly enhanced.

BRIEF DESCRIPTION OF THE FIGURES

FIG. 7 is a logic diagram illustrating implementation of the tests performed during entry to an emulation program.

DETAILED DESCRIPTION

Figure 2:
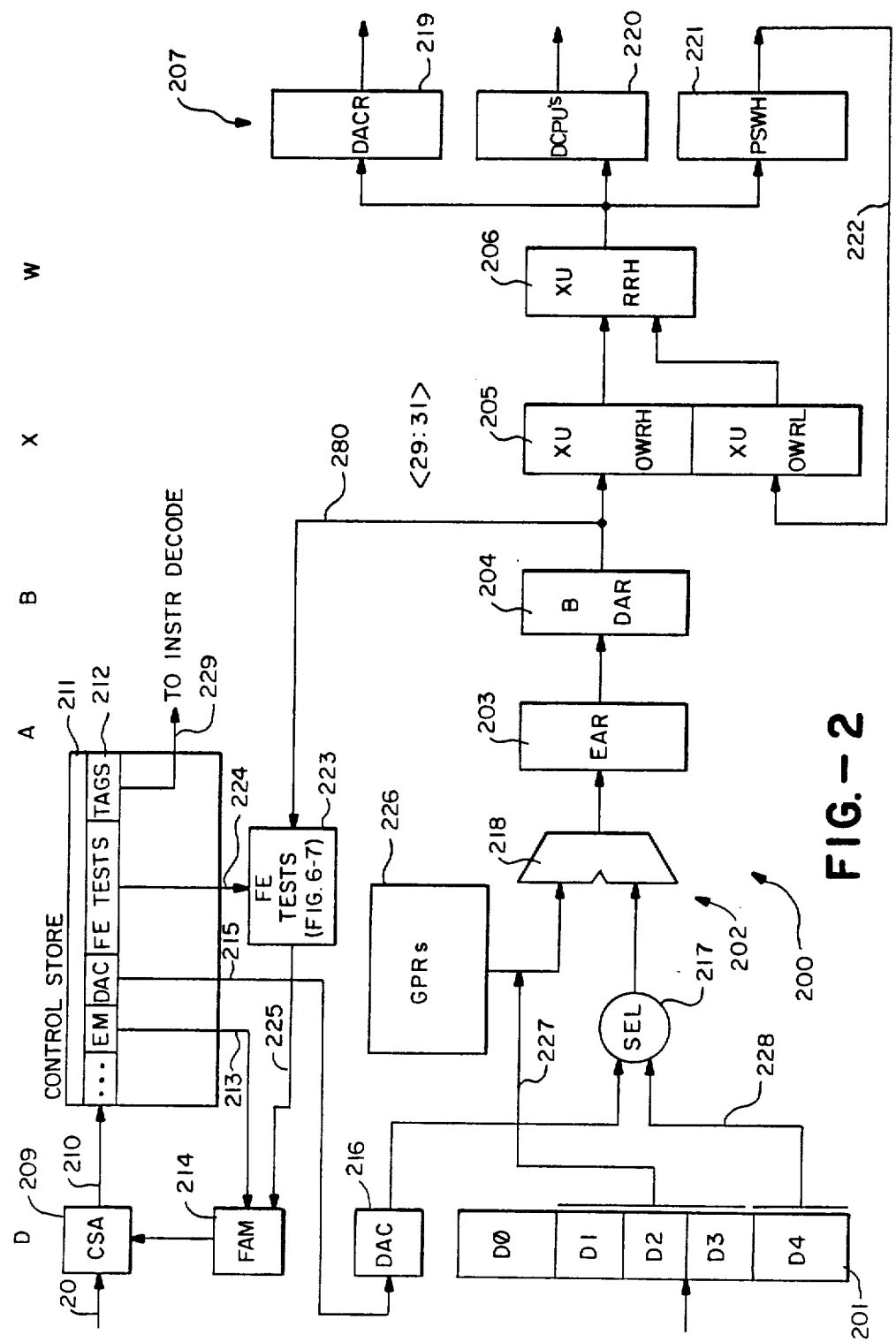
FIG. 2 is a schematic block diagram showing data flow during entry to an emulation program.
Figure 3:
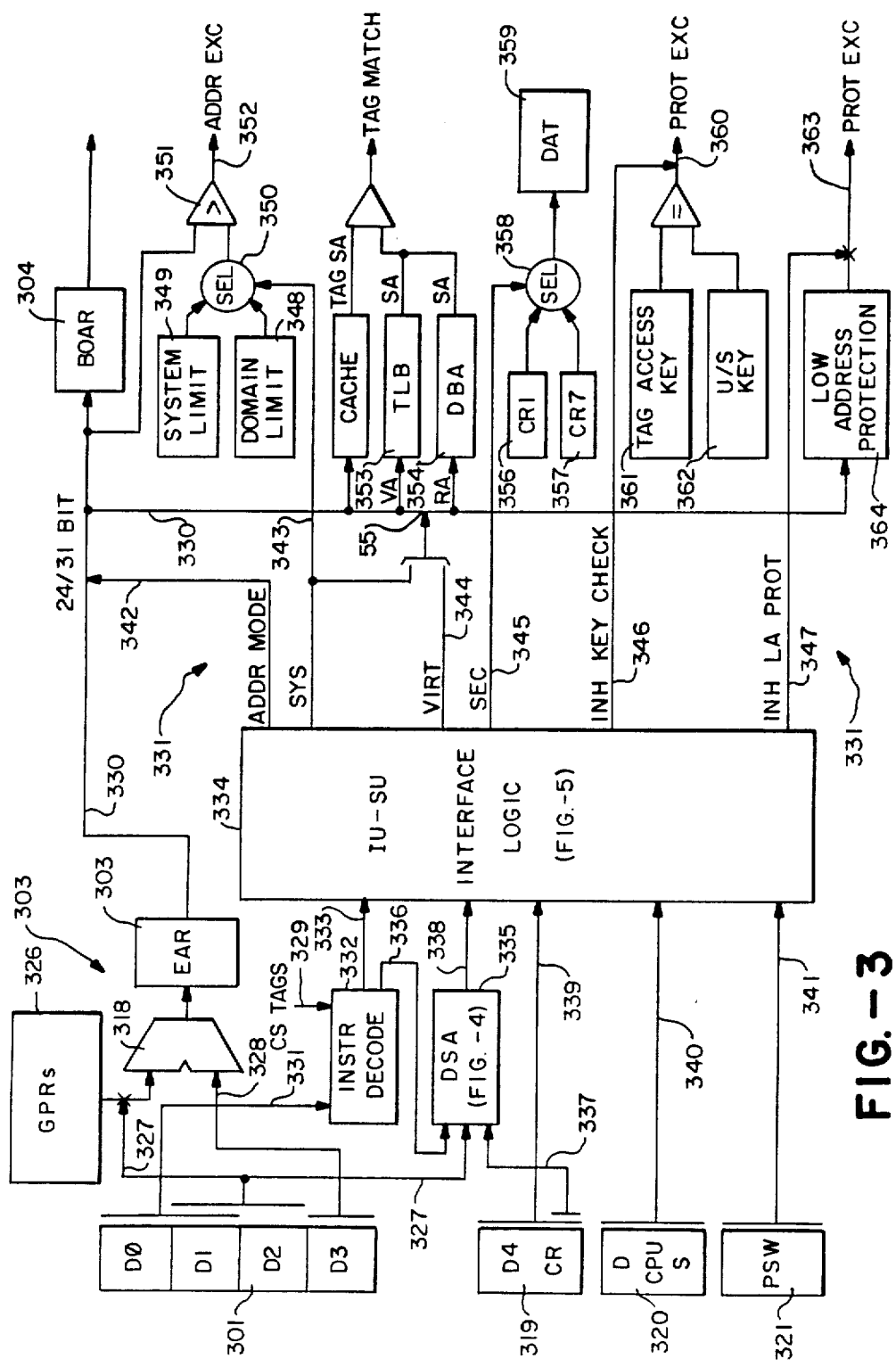
FIG. 3 is a schematic block diagram illustrating data flow during storage access.

With reference to the figures, a detailed description of a preferred embodiment is provided. First, with reference to FIG. 1, the data processing system environment of the present invention is described. With reference to FIG. 2, a part of the apparatus of the present invention is described that operates during entry into an emulation program. In FIG. 3, a part of the present invention that operates during operation of the emulation program is described. With reference to FIGS. 4–7, detailed implementation of elements of the present invention are described.

I. SYSTEM OVERVIEW

Figure 1:
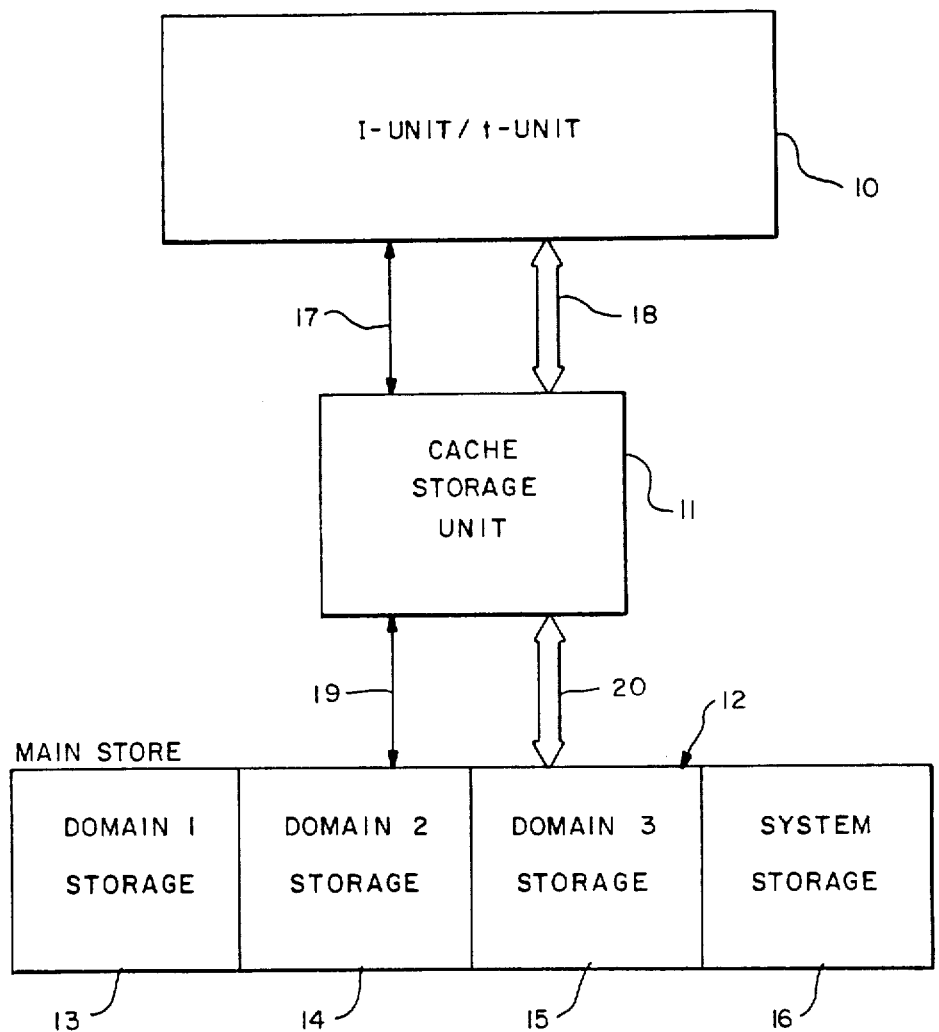
FIG. 1 is an overview block diagram of a data processing machine implementing the present invention.

FIG. 1 illustrates a data processing machine in which the present invention is implemented. The data processing machine includes an instruction unit and execution unit 10 for processing instructions and operands, a cache storage unit 11 for supplying instructions and operands to the instruction unit and execution unit 10, and for retrieving instructions and operands from main store 12.

The instruction unit/execution unit 10 supplies control signals and addresses on line 17 to the cache storage unit. One of the control signals indicates whether a domain access or a system access is desired. Data is returned to the instruction unit/execution unit 10 across bus 18.

Likewise, the cache storage unit 11 sends addresses and control information across line 19 to the main store 12 that have been translated to system addresses. Data is supplied between the main store 12 and the cache storage unit 11 across bus 20.

Each user of the instruction unit and execution unit 10 is assigned a domain in the data processing machine that includes domain storage. Thus, the main storage is shown in FIG. 1 having domain 1 storage 13, domain 2 storage 14, and domain 3 storage 15. In addition, the data processing machine operates in a control state that has access to machine resources and a portion of the main store known as system storage 16. The domain storage and system storage are differentiated by the address space that is allocated to the individual domains. However, a logical processor operating in a domain is not confined in the addresses that it can use during processing. Rather, when the logical processor is initialized, the cache storage unit is set up to recognize a request for domain storage and to translate addresses supplied by the instruction unit/execution unit 10 into domain address space.

Not shown in FIG. 1 are input/output facilities, channels, direct access storage devices and other resources that are assigned to individual domains for use by a particular user of the machine. These facilities, although included in an overall data processing machine environment, are not important to the present invention.

The present invention has particular application in the emulation of instructions, as mentioned in the background of the invention. Instructions that do not fall within the machine set are executed by branching to an emulation program in system storage that is executed by temporarily leaving the user state and entering the control state. In the control state, the machine resources that are available to the control state can be thought of as a system domain. The system domain includes the system storage. However, because real system addresses are used by programs running in the control state, the cache storage unit 11 does not translate addresses as is done in a user state.

During emulation, when the machine is operating in the control state, access to domain storage in which the operands of the instruction to be implemented are stored, is often necessary. Thus, the storage unit 11 must be notified when a domain storage access is being made so that the appropriate translation of the address to domain address space can be made. In addition, other storage unit parameters necessary for data access are manipulated to facilitate the access to domain storage.

A. Entry into an Emulation Control State

FIG. 2 illustrates a portion of the instruction unit according to the present invention that operates during entry into an emulation program. A sequence of instructions is supplied through a pipeline 200 that includes a D-Cycle instruction register 201, a means 202 for generating an address of an operand to be used in execution of the instruction, an A-Cycle effective address register 203, a B-Cycle operand address register 204, an X-Cycle register 205, a W-Cycle register 206, and a plurality 207 of control registers.

In response to an instruction that is supplied on line 208, a control store address is generated in means 209 and supplied across line 210 to a control store 211. The control store 211 is a means for decoding the instruction to generate a control code. When an instruction is received that is to be emulated, the control code 212 is addressed. A portion of the control code 212 is supplied across line 213 to indicate that emulation is to be carried out. The code on line 213 is supplied to a means 214 for generating a branch address for supply to the control store address generating means 209. In the following cycle a branch address is supplied on line 210 to the control store to generate a control code for entry into the emulation mode, known as fast assist mode FAM.

Next a code is supplied on line 215 that identifies data access controls to be used during the emulation program. The data access control code DAC is supplied across line 215 to register 216. In a flow of the instruction unit pipeline 200, the contents of the DAC register 216 are selected in selector 217 through adder 218 to the A-Cycle effective address register 203. The DAC passes down the pipeline to the operand address register 204, the operand word register 205, the result register 206 and is stored in a DAC control register 219 (DACR), to be utilized during the emulation program. The character of the DAC code is described in more detail below.

The control registers 207 further include a domain CPU status register 220 (DCPUS) and a program status word register 221 (PSW). The domain CPU status register 220 is loaded by reading the program status word (the high order portion in the preferred embodiment) across line 222 into the X-Cycle operand word register. From the operand word register 205 it is supplied to the W-Cycle result register 206 and from there into the domain CPU status register 220. This domain CPU status code in register 220 is also utilized during execution of the emulation program as described below. The contents of the program status word register 221 are loaded during execution of certain machine instructions such as load PSW.

According to the present invention, in order to facilitate fast entry into emulation programs, certain fast entry tests 223 are executed. The fast entry tests are identified by a portion of the control code 212 supplied across line 224 to the fast entry test module 223. If the fast entry tests 223 fail, a signal is supplied on line 225 to the means 214 for generating a branch address to force the control store address generating means 209 to branch to a new control store location to process the emulation routine in an exception mode called "normal entry". The implementation of the fast entry tests 223 are described below with reference to FIGS. 6 and 7.

The means 202 for generating an address of an operand for use in execution of an instruction includes a plurality of general purpose registers 226, the adder 218, a selector 217, and the instruction platform 201. The instruction platform is divided into a plurality of fields designated as D0, D1, D2, D3 and D4 in the figure. At least one field of the instruction, depending on the format of the instruction as discussed below, is supplied across line 227 to select address information located in a general purpose register from the plurality 226 of general purpose registers for supply as a base address to the adder 218. Thus, at least one field of the instruction in the instruction platform 201 includes information that identifies a location for a base address of an operand to be used in execution of the instruction.

In addition, a second field of the instruction is supplied across line 228 through selector 217 as a second input to the adder 218. Addition of the second field of the instruction supplied across line 228 and the base address supplied from the general purpose registers 226, results in an address of an operand that is supplied to the A-Cycle effective address register 203.

From the effective address register 203, the address is supplied to the storage unit to retrieve data which is supplied to the X-Cycle operand word register from the storage unit.

FIG. 2 illustrates the loading of the control registers 207 and the sequence of events leading to a branch to an emulation program. Control registers 207 are utilized as discussed below in the generation of interface signals for supply to the storage unit for interpretation of the address supplied from the register 203.

B. Operation During Emulation

FIG. 3 illustrates a portion of the instruction unit and storage unit affected by the present invention during the running of an emulation program. Portions of the instruction unit shown in FIG. 3 and also in FIG. 2 include the instruction platform 301 (201 in FIG. 2), the data access control code register 319 (219 in FIG. 2), the domain CPU status register 320 (220 in FIG. 2), and the program status word register 321 (221 in FIG. 2). The means 303 for generating an address for use in execution of an instruction includes general purpose registers 326, the adder 318 and the instruction platform 301. At least one field of the instruction is supplied on line 327 to control selection of a general purpose register 326 for supply of a base address to the adder 318. At least one other field of the instruction platform 301 is supplied on line 328 to the adder 318 for addition with the base address to generate an operand address for supply to the effective address register 303. The address in the effective address register 303 is supplied on line 330 to the storage unit shown generally by the reference numeral 331. Further, it is passed down the instruction unit pipeline to the B-cycle operand address register 304. The rest of the instruction unit pipeline is not described here.

An instruction in the instruction platform 301 supplies a plurality of fields of the instruction across line 381 to a means 332 for decoding the instruction. In addition, control store tags across line 329 are received from the control store in the instruction decoding means 332. In response to the instruction decode, in the means 332, control signals are supplied on lines 333 to the instruction unit/storage unit interface logic 334. The instruction unit/storage unit interface logic 334 is shown in more detail in FIG. 5.

In addition, the field of the instruction supplied on line 327 that identifies a general purpose register holding a base address of an operand is supplied to domain storage access detection logic 335. Control signals on line 336 from the instruction decode are also supplied to domain storage access detection logic 335. Finally, signals from the domain access control register 319 is supplied on line 337 to the domain storage access detection logic 335. The domain storage access detection logic 335 is described in more detail in FIG. 4. It generates a domain storage access signal on line 338 for supply to the instruction unit/storage unit interface logic 334.

The instruction unit/storage unit interface logic 334 in addition receives other control signals from the domain access control register 319 across line 339. Also, the domain CPU status register 320 supplies control signals across line 340 to the interface logic 334 and the program status word register 321 supplies control signals on line 341 to the interface logic 334.

The interface logic 334 generates control signals that are supplied to the storage unit 331 and used in retrieving data in response to addresses that are supplied across line 330 from the effective address register 303. The control signals include the address mode signal on line 342, the system address signal on line 343, the virtual address signal on line 344, the secondary address space signal on line 345, the inhibit check key signal on line 346 and the inhibit low address protection signal on line 347.

The address mode signal on line 342 controls the mode of the address supplied on line 330 by determining whether a 24-bit or a 31-bit address is supplied.

The system access signal on line 343 controls the manner in which the storage unit responds to the address on line 330, as either a system address or as a domain address. When a system control program is set up, the storage unit is loaded with parameters defining domain limits in system storage into register 348. The address space assigned to the system control state is also stored as system limits in a register 349. The system limits and domain limits are supplied to a selector 350 which is controlled by the system access signal on line 343 to select either the system limit or the domain limit. An address on line 330 is compared in comparator 351 with the selected system limit or domain limit to determine whether a valid address has been supplied for access. If the address is not a valid address, then an address exception is generated on line 352.

In addition, the system access signal is used to determine the kind of translation performed on the address in the cache. A domain address can be either a virtual address or a real address. If it is a virtual address, then a translation lookaside buffer 353 is used in translation. If it is a real address, a domain base adjust mechanism 354 is used to adjust the address to a system address within the domain. If it is not a domain access, then no translation or domain base adjust is necessary.

A virtual address signal on line 344 in combination with the system address signal on line 343 is thus used to control the mode of translation as indicated at 355.

For dual address space instructions as specified in IBM/370 architecture, the secondary address space signal on line 345 controls access to the primary and secondary stores. The location of the primary and secondary address spaces is specified in control register 1 (356), and control register 7 (357), respectively. The secondary address space signal on line 345 controls the selector 358 for supplying the appropriate identifier to the dynamic address translation circuitry 359.

The inhibit key check signal on line 346 inhibits generation of a protection exception on line 360 when the tag access key and the user storage keys do not match as indicated by the values stored in registers 361 and 362 respectively.

The inhibit low address protection signal on line 347 inhibits the generation of protection exception on line 363 when low address protection detection circuitry 364 detects an address from line 330 in a low address area.

As can be seen, the storage unit receives an address on line 330 and processes it in response to a plurality of control signals. For each instruction that supplies an address to the storage unit to retrieve an operand, the system access signal on line 343 specifies whether a system address or a domain address is being supplied. However, as mentioned above, the instruction platform 301 contains no field or bit to specify a system or domain access is being made. According to the present invention, a means is provided for generating a control code upon entry into an emulation program that is stored in the domain access control register 319 to enable implied domain addressing. The domain storage access detection logic 335 compares the contents of the field from the instruction that specifies the general purpose register to be used in generation of the operand address with a preselected range of general purpose registers to determine whether domain access is required for certain instruction. The domain access storage logic 335 also receives certain control signals from the instruction decode 332 across line 336 identifying instruction formats as described in more detail below. A domain access control signal is supplied on line 338 to the instruction unit storage unit interface logic 334 to influence the generation of the system access signal on line 343.

In addition, according to the present invention, the domain access control register 319 stores other signals that in combination with the control signals stored in the domain CPU status register 320, operate to override the signal supplied from the program status word register 321 to the interface logic 334. These control signals influence the generation of the address mode signal on line 342, the virtual address signal on line 344, the secondary address signal on line 345, the inhibit check key signal on line 346 and the inhibit low address protection key on line 347 during an access to domain address space from an emulation program operating in control state. The features described in the present application are described below.

C. Implied Domain Addressing

With Implied Domain Addressing, the instruction set capable of use in accessing domain storage from Control State is extended to include essentially all instructions which are capable of accessing system storage. A particular range of system GPRs 326, when they are used to provide a base address, can optionally cause implicit domain addressing. These registers are termed Domain Addressing Base Registers, or DABRs.

Implied Domain Addressing is activated via DABR Activation Control bits in the DACR 319. When Implied Domain Addressing is active, and a Domain Addressing Base Register is used to address an operand, Domain Addressing is used instead of System Addressing, except for those references which are explicitly specified as always using System Addressing or always using Domain Addressing.

D. Domain Addressing Base Registers (DABRs).

System GPRs 2-7 are designated the Domain Addressing Base Registers (DABRs). They operate identically to the other system GPRs except when Implied Domain Addressing is active, and they are specified in particular register field(s) of an instruction. In that case, Domain Addressing rules are followed (in performing effective address calculations and/or accesses to main storage) for the corresponding operands in the following cases:

Instruction operands which are virtual addresses.
Instruction operands which are logical addresses.
Instruction operands which are real addresses.

Implied Domain Addressing never applies to the following cases:

Instrument addresses.
Addresses of PSWs, interruption codes, and associated information used during an interruption.

Addresses that are added by the hardware as an offset to a base address. In this case, the base address determines the type of addressing.

Formation of operand addresses that are not used as addresses.

The following table shows the register fields, for each instruction format, which designate the DABRs for addressing by each operand, in Control State when the corresponding system GPRs are active as DABRs.

Base Registers Used as DABRs:

| Instr. Type | *** Instruction Format *** | DABR addr for: Opd 1 | Opd 2 |
|---|---|---|---|
| RR | / OPC /R1/R2/ | R1 | R2 |
| RR | / OPC /M1/R2/ | — | R2 |
| RR | / OPC / I / | — | — |
| RS | / OPC /R1/**/B2/ D2 / | — | B2 |
| RX | / OPC /**/X2/B2/ D2 / | — | B2 |
| S | / OPC /B2/ D2 / | — | B2 |
| SI | / OPC / I2 /B1/ D1 / | B1 | — |
| SS | / OPC / ** /B1/ D1 /B2/ D2 / | B1 | B2 |
| SSE | / OPC /B1/ D1 /B2/ D2 / | B1 | B2 |
| RRE | / OPC / / /R1/R2/ | — | R2 |

E. Domain Access Controls

Domain Access Controls activate implied domain addressing for each storage operand. Two bits are defined to allow 2 ranges of DABRs. However, this can be generalized to allow one control bit for each DABR.

Each control bit can be set independently, depending on whether implied domain addressing is to be used for a particular set of DABRs. The domain access control bits are defined in the control word of the instruction to be emulated and can be manipulated by control state machine instructions.

In the fast assist mode FAM, fields of the current PSW are overridden. Program execution is controlled by an effective PSW. Operation is in EC mode and supervisor state with many interruptions disabled. For system storage accesses, 31 bit real addressing is used with program event recording (PER) disabled. The PSW key for system storage accesses (system key) is set by macrocode when a domain is activated.

The effective PSW that controls domain storage accesses in FAM is called the Domain CPU Status (DCPUS). The DCPUS in FAM is the PSW that was in effect for the instruction to be emulated. This PSW is captured as part of the FAM entry routine and placed in a system register. It specifies the user control mode and controls:

PER for domain references as controlled by Control Registers 9, 10, and 11.
Domain addressing relating to
Dynamic Address Translation
Addressing Mode
Domain Key
Address Space Control.

In FAM the DCPUS can be modified using a control state defined instruction. This is equivalent to loading a new PSW.

Domain Access Controls allow manipulation of various bits in the PSW associated with domain storage accesses. The facility is called Domain Access Controls. Domain Access Controls specify override actions for certain fields of the DCPUS and/or control registers, which would otherwise control domain addressing, in addition to the bits provided to control activation of the Domain Access Base Registers (DABRs) used for implied domain addressing. This allows the emulation routine the capability of manipulating these functions without modifying the domain PSW. This improves the efficiency of the emulation routine by reducing the number of instructions required for emulation. The Domain Access Controls are contained in the Domain Access Control Register (DACR). The DACR is loaded from the control word of the emulated instruction on FAM entry, and can be modified in the emulation routine by control state machine instructions.

DOMAIN ACCESS CONTROLS FORMAT:

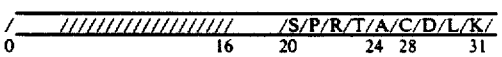

```
/////////////////      /S/P/R/T/A/C/D/L/K/
0              16   20         24 28     31
```

/ = Reserved
S = Secondary Addressing Override: Use secondary virtual addressing on Domain Addressing storage references which are subject to translation (overrides effective DCPUS S bit - treated as 1).
The setting of this control is ignored if the effective DCPUS specified BC mode.
P = Domain Primary Addressing Override: Use primary vitrual addressing on Domain Addressing storage references which are subject to translation (overrides effective DCPUS S bit - treated as 0).
The setting of this control is ignored if the effective DCPUS specifies BC mode.
B = Domain Per Storage Alteration Override: Supress PER storage-alteration-event tests on Domain Addressing storage references (overrides CR9 bit 2 - treated as zero).
T = Domain Translation Override: Supress translation on logical on Domain Addressing storage references (overrides effective DCPUS T bit - treated as zero).
A = Domain Addressing Mode Override: Use 31-bit effective addressing generation rules for domain addresses. (Overrides effective DCPUS (A)-treated as one). This control takes effect irrespective of whether the effective DCPUS specifies BC mode or EC mode.
C = DABR Activation Control 1: Activate Implicit Domain Addressing for system GPRs 4–7 as DABRs.
D = DABR Activation Control 2: Activate Implicit Domain Addressing for system GPRs 2–3 as DABRs.
Note: Bits C and D may both be one. In that case both designated sets of system GPRs are active DABRs.
L = Domain Low-Address Protection Override: Supress low-address protection on domain addressing storage references (overrides CR0 bit 3 - treated as 0).
K = Domain Key Protection Override: Suppress key protection on Domain Addressing storage references (overrides effective DCPUS KEY field, bit 8-11 - treated as zeros).

The following table summarizes the actions of the Domain Access Controls:

|  | OVERRIDES | EFFECT ON DOMAIN ADDRESSING WHEN CONTROL IS ON: |
|---|---|---|
| S - Domain Secondary Addr. Override | DCPUS.S | Secondary Addr. |
| P - Domain Primary Addr. Override | DCPUS.S | Primary addr. |
| R - Domain PER Override | CR9.2 | PER storage alt. off |
| T - Domain Translation Override | DCPUS.T | DAT off |
| A - Domain Addressing Mode Override | DCPUS.A | 31-bit eff. addr. |
| C - DABR Activation Control 1 | — | DABR set 1 activated |
| D - DABR Activation Control 2 | — | DABR set 2 activated |
| L - Domain Low-Addr-Protection Ovrrd. | CR0.3 | LAP off |
| K - Domain Key Protection Override | DCPUS.KEY | Key protection off |

1. The Override Controls operate as follows:

When a bit is on, the corresponding override is made active for all Domain Addressing by the CPU in FAM. When a bit is off, the corresponding override action is defeated, and Domain Addressing proceeds as usual (under control of the DCPUS, control registers, etc.).

2. The DABR Activation Controls control use of the DABRs in determining whether domain addressing rules apply.

They operate as follows:

If a bit is off, the associated set of system GPRs operate identically to the other system GPRs. If a bit is on, the associated set of system GPRs is active as DABRs. Use of one of those system GPRs as a base for logical or real addressing causes domain addressing rules to be followed.

II. IMPLIED DOMAIN ADDRESSING IMPLEMENTATION

Figure 4:
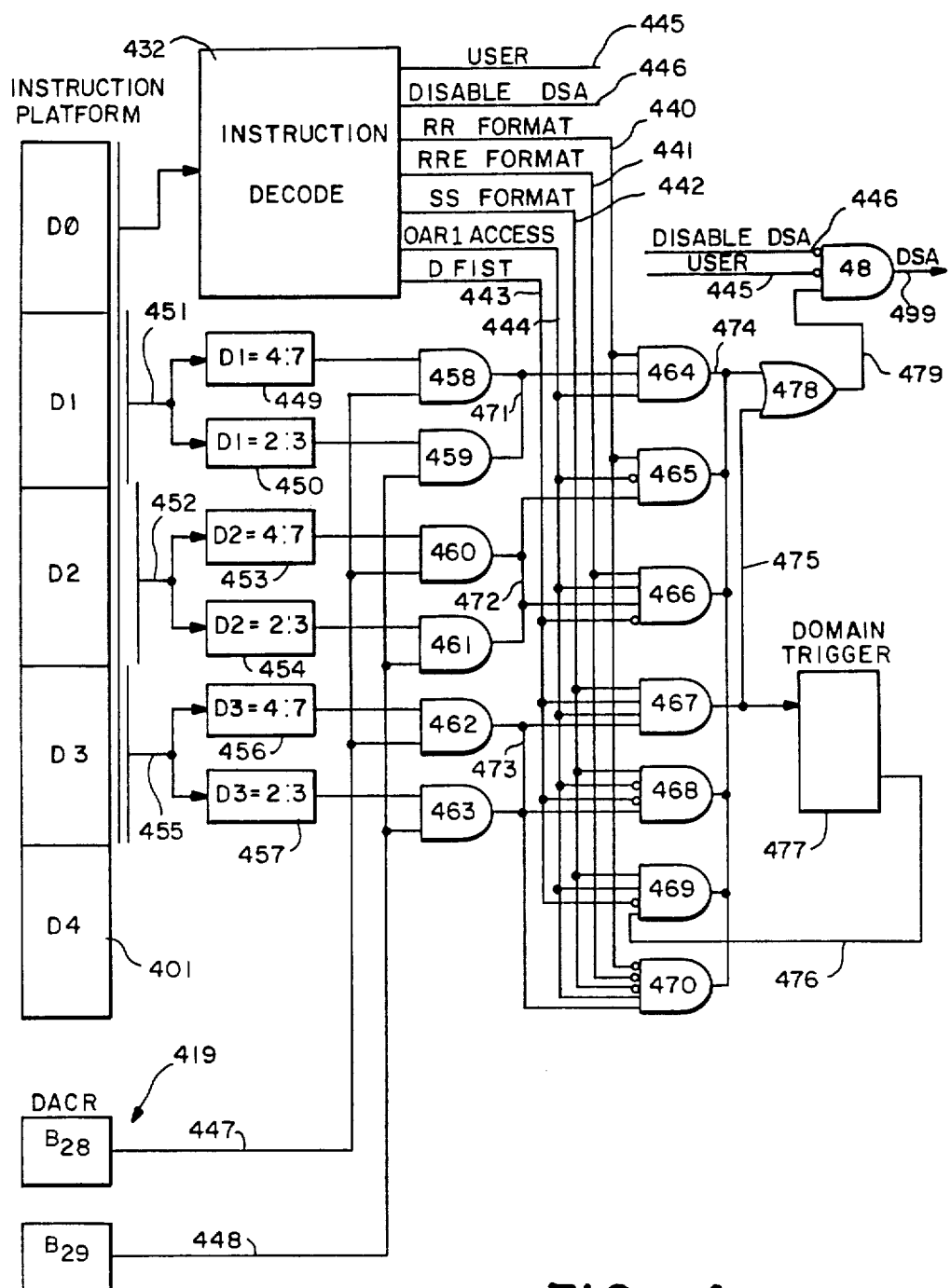
FIG. 4 is a more detailed diagram of logic implementing implied domain storage access.

The logic diagram for domain storage access logic 335 is shown in FIG. 4. The logic establishes whether the current storage access is a Domain Storage Access (DSA).

The instruction OPCODE field D∅ (D∅, D1, D2 for 2 byte OPCODES) is decoded in logic 432 for instruction format types. Only RR, RRE and SS formats are decoded as indicated by signals on lines 440, 441 and 442, respectively. All other formats have their DABR field in the same position. Instruction decoding is also provided to establish whether the storage access involves the first storage operand. This is important in cases such as SS format instructions where there are 2 storage operands, each having its own unique DABR. Certain RR format instructions also have 2 storage operands. The term "OAR1 access" on line 444 indicates that the first storage operand is being accessed. That is, B1 for SS formats and R1 for RR formats. Since all other formats have only one storage operand, the "OAR1 access" applies to either B1 or B2 operands.

Three other functional signals are provided by the instruction decode logic 432:

(1) DFIST on line 443—indicates the first flow or sequence of an instruction algorithm.

(2) USER on line 445—indicates that the processor is in user state (that is—not FAM or control state).

(3) DISABLE DSA on line 446—a decode which inhibits Domain storage access for certain instruction types such as branch instructions which require system addresses.

The domain access control register bits 28 on line 447 and 29 on line 448 activate implicit domain addressing for system GPRs 4–7 and 2–3 as DABRs respectively.

FIG. 4 shows the logic implementation of domain storage access logic having reference number 335 in FIG. 3. The instruction platform is broken down into a plurality of fields, D0–D4, as described above. Depending on the format of the instruction, a particular field is used to access a base address from a general purpose register. Thus, either the D1, D2 or D3 fields can be used to specify a general purpose register. The domain storage access logic thus includes means 449 for comparing the D1 field to determine whether it specifies a register within the range of 4 to 7, and a means 450 for determining whether the D1 field is within the range of 2 to 3. These are connected to receive the contents of the D1 field across line 451.

The contents of the D2 field are supplied across line 452 to means 453 for detecting whether D2 falls within the range of 4 to 7 and means 454 for determining whether D2 falls within the range of 2 to 3.

The D3 field is supplied on line 455 to a means 456 for determining whether D3 falls within a range of 4 to 7 and a means 457 for determining whether D3 falls within a range of 2 to 3. Obviously the range of general purpose registers used for domain access base registers is arbitrary and can be selected from any range that suits the user.

Depending on the values of bits 28 and 29 from the domain access control register 419, either range 4 to 7 or 2 to 3, or both, is specified as the domain address base register range. Thus, AND-gate 458 receives as inputs bit 28 from line 447 and the output of the comparator 449 to generate a true output when a domain address base register from the range 4 to 7 has been specified by the field D1. AND-gate 459 receives as inputs the output of the comparator 450 and the bit 29 on line 448 from the domain access control register to generate a true output when a domain address base register in the range 2 to 3 has been specified by the field D1. Likewise, AND-gate 460 receives as inputs the output of comparator 453 and bit 28 from line 447 and AND-gate 462 receives the output of comparator 456 and bit 28 on line 447 from the domain access control register. The output of AND-gates 460 and 462 go true when a domain address base register in the range of 4 to 7 has been specified by fields D2 or D3, respectively.

AND-gates 461 and 463 receive as inputs the output of comparators 454 and 456 respectively as well as the bit 29 from the domain access control register on line 448. The outputs of AND-gate 461 and 463 go true when a domain address base register in the range 2 to 3 is specified in the fields D2 or D3, respectively.

The output of AND-gates 458 and 459 are supplied to line 471 to indicate a domain access from an instruction format that specifies a domain address base register in field D1. The output of AND-gates 461 and 460 are supplied to line 472 to indicate a domain access by an instruction format that specifies a domain address base register for field D2. The outputs of AND-gates 462 and 463 are supplied on line 473 to indicate a domain storage access from an instruction format that specifies a domain address base register on field D3.

AND-gate 464 receives as inputs the RR format signal on line 440, the D1 field domain access signal on line 471 and the OAR1 access signal (OAR1) on line 444 which generates a true output for a domain access on the first operand in an RR format on line 474.

AND-gate 465 receives as inputs the RR format signal on line 440, the inverse of the OAR1 access signal on line 444, and the D2 field domain access signal on line 472. Gate 465 generates a true output on line 474 for an RR format instruction that specifies a domain access from the D2 field that is not the first operand access as indicated by the signal on line 444.

AND-gate 466 generates a true output on line 474 when an instruction in the RRE format is supplied for the first access from the operand address register for a domain address from field D2 and it is not the first flow of an instruction.

The output of AND-gate 467 generates a true output for instructions in the SS format during the first flow of an address from the instruction when a domain access is requested from field D3. The output of AND-gate 467 is supplied on line 475.

AND-gate 468 generates a true output when an instruction in the SS format is supplied and it is not the first address and not the first flow for a domain address register specified from field D3.

The output of AND-gate 469 is asserted on line 474 for instructions in the SS format for a first address from the operand address register when it is not the first flow and when a signal on line 476 is true.

The output of AND-gate 470 asserts a true signal on line 474 for all instruction formats other than RR, RRE, and SS during the first OAR1 access when a domain address base register is specified from field D3.

The output of AND-gate 467 is supplied on line 475 to a domain trigger latch 477 which supplies a signal on line 476 for controlling the output of AND-gate 469.

The signals on line 474 and 475 are supplied to OR-gate 478 which generates an output on line 479. AND-gate 480 generates the domain storage access control signal on line 499 in response to the signal on line 479, the inverse of the user signal on line 445 and the inverse of the disable DSA signal on line 446.

The design equation for DSA is as follows:

R1 field has a value of 2 or 3 and it is anded with DACR bit 29 for DSA activation.

To activate a Domain Storage Access for the second storage operand ( ¬ OAR1 ACCESS) of an RR format instruction, the R2 address (in the D2 instruction platform field) is used as a DABR with the D2=4:7 term anded with DACR bit 28 or the D2—2:3 term anded with DACR bit 29.

For an RRE format instruction, the R2 field is moved to the D2 instruction platform field in the first instruction cycle (DFIST). Therefore no storage requests for RRE formats can be issued in this cycle. After the first cycle ( ¬ DFIST) the storage operand access which will be indicated by "OAR1 ACCESS" will use the D2 field as a DABR. Therefore D2=4:7 and DACR bit 28 or D2=2:3 and DACR bit 29 cause Domain Storage Access.

For SS format instructions, the first storage operand (OAR1 ACCESS) can be accessed in the first instruction flow (DFIST). The B1 field is contained in the D3 field of the instruction platform. Therefore, D3=4:7 is anded with DACR bit 28 or D3=2:3 is anded with DACR bit 29 to activate Domain Storage Access.

At the end of the first instruction flow, the D3 field is updated with B2 data and the B1 data field is lost. A trigger called the Domain Trigger is set in this cycle if the Domain Storage Access condition is active. Set Domain Trigger by:

DFIST & ¬ USER & SS FORMAT & [(D3−4:7) & DACR<28> +(D3=2:3) & DACR<29>]

Thereafter, whenever another storage access for the first storage access occurs (OAR1 ACCESS), a Domain Storage Access will result if the Domain Trigger is on. For the second operand ( OAR1 ACCESS), the B2 field is moved into the D3 field of the instruction platform. Therefore, after the first instruction flow ( DFIST), a Domain Storage Access is indicated when D3=4:7 and DACR bit 28 or D3=2:3 and DACR bit 29 are active.

For all other instruction formats, only one storage operand exists and it may be either the B1 or B2 field of the instruction. It will reside in the D3 field of the instruction platform. Therefore, for these formats ( RR FORMAT & RRE FORMAT & SS FORMAT) when the storage access is active (OAR1 ACCESS) the

```
RR FORMAT & ¬ DISABLE DSA & ¬ USER & ¬OAR1 ACCESS & [(D1=4:7) &
DACR <28> + (D1=2:3) & DACR <29>] + ¬ OAR1 ACCESS &
[(D2=4:7) & DACR <28> + (D2=2:3) & DACR <29>])

+RRE FORMAT & ¬DISABLE DSA & ¬ USER & ¬DFIST & OAR1 ACCESS [(D2=4:7) &
DACR <28> + (D2=2:3) & DACR <29>]

+SS FORMAT & ¬ DISABLE DSA & ¬ USER & (DFIST & OAR1 ACCESS & [(D3=4:7) &
DACR <28> + (D3=2:3) & DACR <29>] +
¬DFIST & ¬OAR1 ACCESS & [(D3=4:7) & DACR <28> + (D3=2:3) & DACR <29>] +
DFIST & OAR1 ACCESS & DOMAIN TGR) +
¬RR FORMAT & ¬ RRE FORMAT & SS FORMAT & DISABLE DSA &
¬ USER & OAR1 ACCESS & [(D3=4:7) & DACR <28> + (D3=2:3) & DACR <29>]
```

The "¬ user" term allows domain addressing for control state, particularly FAM.

For RR formats, the first storage operand (OAR1 ACCESS) uses the R1 field of the instruction as a DABR. This field is contained in the D1 instruction platform field. The term "D1=4:7" indicates that the R1 field has a value between 4 and 7, and it is anded with the DACR bit 28 to activate a Domain Storage Access. Similarly, the "D1=2:3" term indicates that the Domain Storage Access is Activated by D3=4:7 and DACR bit 28 or D3=2:3 and DACR bit 29.

III. DOMAIN ACCESS CONTROL IMPLEMENTATION

The Domain Access Controls manipulate various control signals to the storage unit. The control bits are loaded into the Domain Access Control Register (DACR) from the control word of the instruction to be emulated at the beginning of the FAM entry routine. The register can be modified by the "Load DACR" instruction in FAM. The controls basically override the Domain CPU Status (DCPUS) which is the domain or user PSW in effect at the beginning of FAM entry. The DCPUS is loaded into system register 6. The access signals that are impacted by the Domain Access Controls are as follows:

System (Domain)
Virtual (Real)
Address Mode
Address Space
Inhibit Key Checks
Inhibit Low Address Protection
Store PER The logic equations presented with each signal are a subset of the full logic equation and only relate to the domain storage access portion of the logic. There are special exception cases in some of the equations, indicated by a "Force_____" term. This term in effect can override the DAC overrides. The Domain Access Control logic is shown in FIG. 5.

Figure 5:
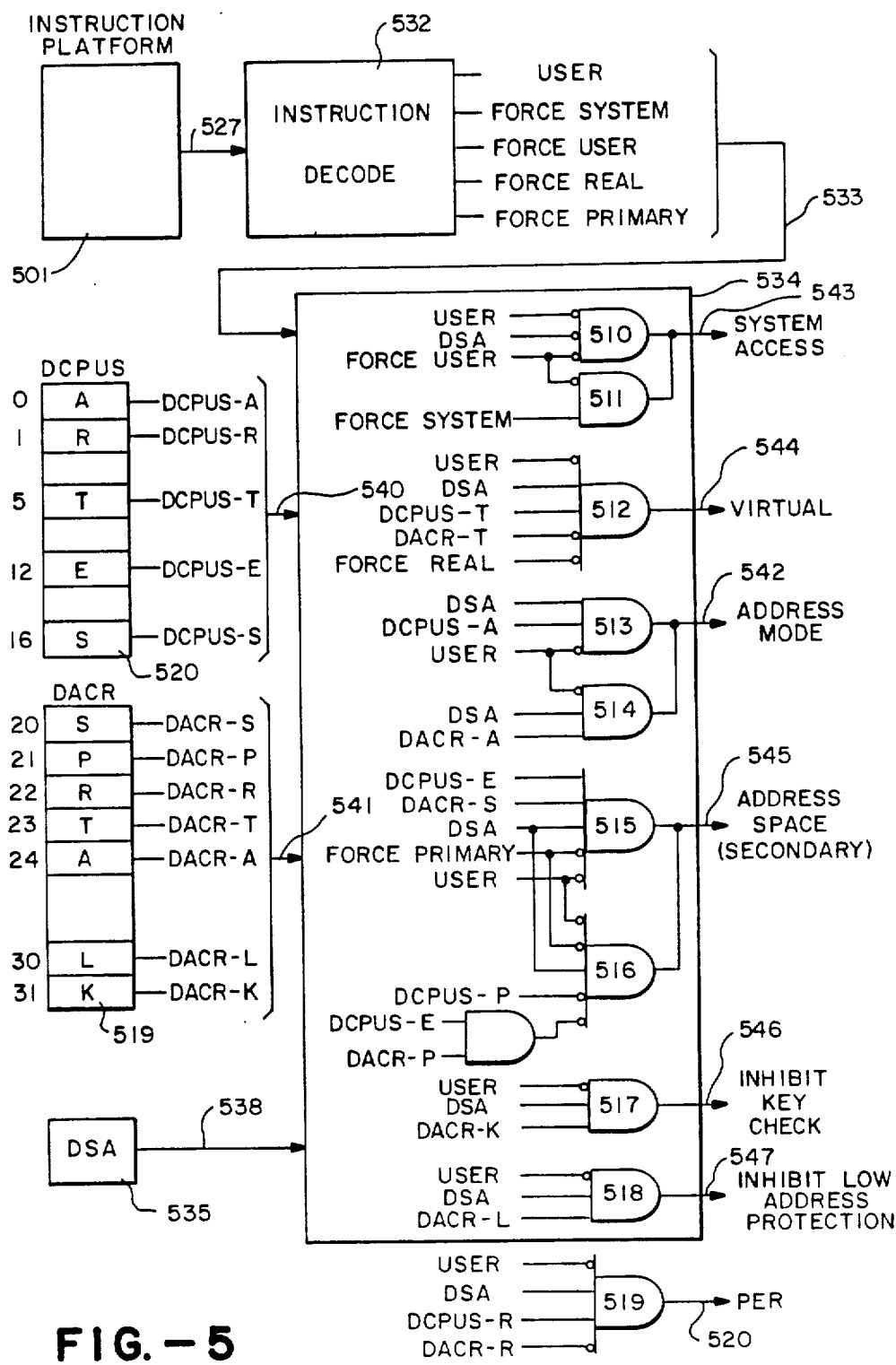
FIG. 5 is a logic diagram of the instruction unit-storage unit interface during domain storage access.

As shown in FIG. 5, the instruction platform 501 supplies a portion of the instruction across line 527 to the instruction decode 532 (which corresponds to the instruction decode logic 332 in FIG. 3). Instruction decode logic 532 generates a force system signal, a force user signal, a force real signal and a force primary signal across line 533 which is supplied to the instruction unit/storage unit interface logic 534 (corresponding to block 334 in FIG. 3).

In addition, the domain CPU status register 520 supplies control signals across line 540 to the interface logic 534. The domain access control register 519 supplies control signals across line 541 to the interface logic 534. The domain storage access detection logic 535 generates the domain storage access signal (DSA) on line 538 for supply to the interface logic 534.

The output of the interface logic includes a system access signal on line 543, the virtual signal on line 544, the address mode signal on line 542, the secondary address space signal on line 545, the inhibit key check signal on line 546, the inhibit low address protection key on line 547 and the program event recording signal (PER) on line 520.

AND-gates 510 and 511 make up logic generating the system access signal on line 543.

AND-gate 510 receives as inputs the inverse of the user signal, the inverse of the DSA signal, and the inverse of the force user signal.

AND-gate 511 receives as inputs the inverse of the force user signal and the force system signal. Thus, the system access signal on line 543 is true when the force system signal is true and the force user signal is not true. Further, when the force user signal is not true, if the domain storage access signal is not true and the user signal is not true, then the system access signal is asserted.

The virtual signal on line 544 is supplied at the output of AND-gate 512. The input of AND-gate 512 includes the inverse of the user signal, the domain storage access signal, the domain DPU status bit-T, the inverse of the domain access control register bit-T, and the inverse of the force real signal.

The address mode signal on line 542 indicates a 31 bit address when the output of AND-gate 513 or AND-gate 514 is true. The input to AND-gate 513 includes the DSA signal, the bit-A from the domain CPU status signal, and the inverse of the user signal. The output of AND-gate 514 includes the DSA signal, the domain access control register bit-A, and the inverse of the user signal.

The secondary address base signal on line 545 is true when the outputs of AND-gate 515 or AND-gate 516 are true. The input to AND-gate 515 includes the bit-E of the domain CPU status register, bit-S of the domain access control register, the domain storage access signal, the inverse of the force primary signal and the inverse of the user signal. The inputs to AND-gate 516 include the inverse of the user signal, the inverse to the force primary signal and the domain storage access signal. In addition, inputs include the inverse of the bit-P of the domain CPU status signal and the inverse of the output of AND-gate 521. The input to AND-gate 521 includes bit-E of the domain CPU status register and bit-P of the domain access control register.

The inhibit key check signal on line 546 is generated at the output of AND-gate 517. The input to AND-gate 517 includes the inverse of the user signal, domain storage access signal, and bit-K of the domain access control register.

The inhibit low address protection signal on line 547 is supplied from the output of AND-gate 518. The input to AND-gate 518 includes the inverse of the user signal, the domain storage access signal, and bit-L of the domain access control register.

The program event recording signal on line 520 is asserted from the output of AND-gate 519. The input to AND-gate 519 includes the inverse of the user signal, the domain storage access signal, the bit-R from the domain CPU status register, and the inverse of bit-R from the domain access control register.

The storage unit control signals influenced by the DACR and the DCPUS registers are summarized as follows:

A. System Access

This signal on line 543 indicates an access to system address space with system addresses. The signal must be disabled for domain storage accesses.

SYSTEM = [¬ USER & ¬ DSA + FORCE SYSTEM ] & ¬ FORCE USER

In FAM, the DSA signal will disable system accesses. The "force system" term which specifies required system access, overrides the DSA term, and the "force user" term will disable the system access. The force terms are mutually exclusive.

B. Virtual Access

This signal on line 544 indicates that the current storage access will require dynamic address translation.

VIRTUAL = ¬ USER & DSA & DCPUS-T & DACR-T & ¬ FORCE REAL

For domain storage access in FAM the virtual signal is under control of the DCPUS-T bit. However, the DACR-T bit will override the DCPUS-T bit to disable virtual accesses. The force real term will also disable virtual accesses for specific operands which are required to access real storage.

C. Address Mode Access

When active, this bit on line 542 indicates a 31 bit storage address; otherwise a 24 bit address is implied.

ADDRESS MODE = USER & DSA &
[DCPUS-A+DACR-A]

For domain storage accesses in FAM, 31 bit addressing is active if either the DCPUS-A bit or the DACR-A bit is active.

D. Secondary Address Space

When active, this signal on line 545 indicates secondary address space; otherwise, primary address space is implied.

ADDRESS SPACE = ¬ USER & DSA &
¬ FORCE PRIMARY (¬ [DACR-P & DCPUS-EC] & ¬
DCPUS-P + DACR-S & DCPUS-EC)

For domain storage accesses in FAM, the address space signal is active when the DACR-S bit is active while the domain is in EC mode (DCPUS-EC), unless the operand storage access requires a primary space access for the given instruction (force primary). Address space will also be active if the DCPUS-P bit is off and either the DACR-P bit or the DCPUS-EC bit is off, unless again the operand storage access requires a primary space access.

E. Inhibit Key Check

When active, this signal on line 546 inhibits protection key checking in the storage unit.

INHIBIT KEY CHECK = USER & DSA &
DACR-K

For domain storage accesses in FAM, protection key checking is inhibited when the DACR-K bit is active.

F. Inhibit Low Address Protection

When active, this signal on line 547 inhibits low address protection in the storage unit.

INHIBIT LAP = ¬ USER & DSA & DACR-L

For domain storage accesses in FAM, low address protection checking is inhibited when the DACR-L bit is active.

G. Storage Program Event Recording (PER)

This signal on line 520 is not an interface signal to the storage unit, but it is impacted by domain storage accesses in FAM. In fact, the only storage PER events that can occur in FAM are for domain storage accesses since PER is inhibited for system addresses.

ENABLE STORE PER = ¬ USER & DSA &
DCPUS-R & DACR-R

For domain storage accesses in FAM, store PER is under the control of the DCPUS-R bit. However, the DACR-R bit will override the DCPUS-R bit to disable store PER.

IV. FAM ENTRY TESTS IMPLEMENTATION

Figure 6:
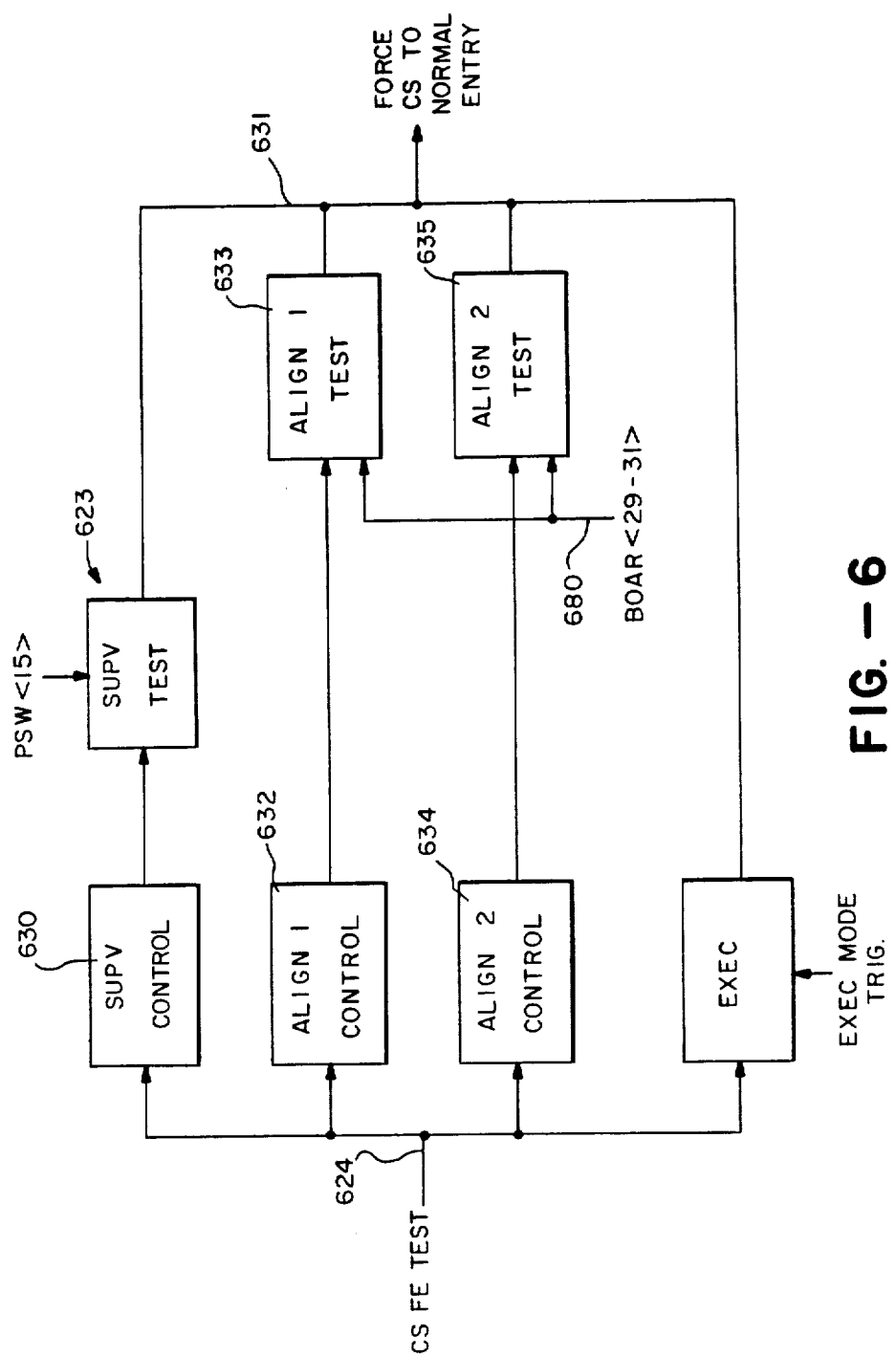
FIG. 6 is a schematic diagram illustrating tests performed during entry to an emulation program.

FIGS. 6 and 7 illustrate implementation of the FAM entry tests indicated by block 223 of FIG. 2.

The instruction emulation routines must test for program exception as part of normal instruction execution, even though the program exceptions may seldom occur. To improve the efficiency of these routines, this disclosure provides a hardware technique which does the program exception testing as part of the emulation entry routine. The tests provide a means of indicating:

whether supervisor state is specified by the PSW during entry to FAM for the emulated instruction.
whether operands of the emulated instruction meet required alignment tests.
whether the FAM entry instruction was the target of an execute instruction.

Each test is performed independent of the outcome of any other test. The tests to be performed are specified in the control word of the instruction to be emulated. If a FAM entry test fails, then an associated bit in a specified system general purpose register (System GPR 3) is set and the mode of entry to FAM is modified from fast entry to normal entry. In this case, instead of branching to the start of the emulation routine, the FAM entry routine would branch to a common routine as an alternative, which services program exceptions and special cases.

As illustrated in FIG. 6 the FAM entry test logic 623 receives the codes from the control store indicating FAM entry test on line 624. The supervisor state test signal is supplied to supervisor test control 630. The supervisor test control reads Bit 15 of the program status word for the instruction to be emulated, which determines whether the problem state is on. If it is on, the test fails as indicated by a signal on line 631. The signal on line 631 is supplied to the control store branch logic 214 to cause a branch to a normal entry to process the exception condition.

In addition, the FAM entry tests performs alignment tests. For instructions that include a first operand, control logic 632 for alignment of the first operand is enabled. During a flow of the instruction pipeline, when the address of the operand reaches the B-Cycle operand address register (204 in FIG. 2), Bits 29 and 31 are read to perform the alignment tests in block 633. If the first operand fails the alignment test, a signal is asserted on line 631 to force the control store to normal entry. Likewise, the alignment of a second operand is enabled through alignment to control 634. When the address of the second operand reaches the B-Cycle operand address register, bits 29 through 31 are read and the test is performed in logic 635. If the test fails, the signal on line 631 is asserted.

Finally, the target of execute test is performed upon entry into fast emulation by checking an execute mode trigger which is set during normal operation when an instruction is subject to an execute instruction as specified by IBM/370 principles of operation. If the execute mode trigger is on during entry, the signal on line 631 is asserted to force the control store to normal entry.

FIG. 7 provides detailed implementation of the test logic for the fast entry tests shown in FIG. 6.

The instruction control word from the control store includes a supervisor test activation bit 701, a 4-bit alignment test code including alignment 1, bit 0 and alignment 1, bit 1, alignment 2, bit 0 and alignment 2, bit 1. In addition, when the opcode is decoded in a decoder 704 in the instruction unit, the execute mode trigger 705 is set when the execute instruction is asserted.

The supervisor test logic includes AND-gate 706, which receives as inputs the supervisor test activation bit from the control word 701 and the bit 15 from the program status word. If both are asserted, the supervisor test fails is indicated by signal on line 707.

The alignment test receives as inputs the alignment 1, Bit 0 and Bit 1 from block 702 of the control store and the alignment 2, Bit 0 and Bit 1 from block 703 of the control store which are supplied to a selector 708. The selector is controlled by the alignment control logic selecting alignment 1 control words during the flow of the first operand address and alignment 2 control words during the flow of the second operand address. The alignment test control signals from the control store are decoded in a decoder 709 as specified in the table below.

If the value is 00, the signal on line 710 is supplied to AND-gate 711. The output of AND-gate 711 indicates that there is no alignment test to be performed so the test passes.

If the value of the selected code is 01, a signal is supplied on line 712 as one input to AND-gate 713. The other input to AND-gate 713 is the inverse of Bit 31 of the operand address register and a check is performed on half word alignment.

If the value selected to the decoder 709 is 10, then a signal supplied on line 714 is one input to AND-gate 715. The other inputs to AND-gate 715 include Bits 30 and 31 from the operand address register. Thus, the output of AND-gate 715 is the result of a full word alignment check.

If the value of the selected code is 11, a signal is asserted on line 716 and supplied as one input to AND-gate 717. THe other inputs to AND-gate 717 include bits 29, 30 and 31 of the operand address register. Thus, a double word alignment check is performed.

If the alignment test passes as indicated by the output of any of the gates 711, 713, 715, 717, a signal is asserted.

AND-gates 719, 720 and 721 combine to set an alignment test fail trigger 722. The value of the alignment test fail trigger is supplied on line 707 indicating the alignment test has failed. The inputs to AND-gate 719 include an operand 1 test control signal indicating a test of the first operand from the alignment test control and the inverse of the alignment test pass signal from line 718.

The inputs to AND-gate 720 include the inverse of the alignment test pass signal on line 718, and an operand 2 test control signal from the alignment test control.

The inputs to AND-gate 721 include the operand 2 test control signal from the alignment test control and the output of the alignment of the test fail trigger 722. When the output of any of the gates 719 through 721 is true, the alignment test fail trigger 722 is set. Signals on line 707 are supplied to OR-gate 723 so that if any of tests fail, a signal is supplied to fast entry logic (214 in FIG. 2), to disable entry into the fast emulation and require normal entry.

In addition, the failure of each of the tests is indicated by storing a bit in a system general purpose register 724.

A. Supervisor Test

When the function is selected for an instruction, and the instruction is executed in User State, if the current PSW (Problem State) is on:

Normal entry instead of fast entry to FAM will occur.

System GPR3 (1) is set to one.

The supervisor test is activated by a bit in the control word of the instruction to be emulated. This bit is anded with PSW bit 15 (problem state), indicating a privileged instruction being emulated in problem state, and causes the supervisor test to fail. Fast entry is disabled and normal entry is enabled. Macrocode will emulate the instruction according to the environment through the normal entry routine rather than executing the emulated instruction. Macrocode knows that the supervisor test failed because the hardware/microcode stored the results of the supervisor test in bit 1 of system GPR3.

B. Alignment Test

A model may provide for alignment tests on specific operands of specific instructions. If the function is available and selected for an instruction operand, a 2-bit code specified by control store fields determines the type of alignment test to make on the instruction operands. The possible code values and test types are:

| VALUE | TEST |
|-------|------|
| 00 | No check |
| 01 | Half word alignment check |
| 10 | Full word alignment check |
| 11 | Double word alignment check |

If a fast entry instruction fails the alignment test:

A normal entry instead of fast entry to FAM will occur.

System GPR3 (0) is set to one.

The alignment test for one or two instruction operands is activated by two bits per operand in the control word of the instruction to be emulated. The proper activation bits are selected when the associated low order 3 bits of the storage operand address are available. The operand 1 alignment test is used for all instruction formats except RR and SS formats. The operand 2 alignment test is used for the second storage operand of RR and SS format instructions to be emulated. The selected 2 bit activation code is decoded and gated with the associated operand address register (OAR) bit(s) to be tested. A 00 code indicates no alignment test. A 01 code will test operand address bit 31 (OAR 31). If it is a one, the alignment test will fail. A 10 will test operand address bits 30 and 31. If either bit is a one, the alignment test will fail. Finally a 11 code will test operand address bits 29, 30, and 31. If any bit is a one, the alignment test will fail.

In the case of instructions with two storage operands to be emulated, the results of the first test is held in an "alignment test fail" trigger while the second operand address is being tested (if activated). If either operand fails the alignment test, fast entry will be disabled and normal entry will be taken. Macrocode will emulate the instruction according to the environment through the normal entry routine rather than executing the instruction. The alignment test failure will cause bit 0 of system GPR3 to be set.

C. Target of Execute Test

GPR3(2) will be set ot 1 if the FAM entry instruction was the target of an EXECUTE instruction. If the FAM entry instruction would otherwise cause a fast entry to FAM, the entry mode is changed to normal.

Macrocode must know when emulating an instruction whether the instruction is a target of an execute instruction. During the normal processing of an execute instruction, the hardware sets an "execute mode" trigger indicating that the subject instruction is a target of an execute. If this trigger is on during FAM entry, fast entry will be disabled and normal entry will be taken, and bit 2 of system GPR3 will be set.

V. CONCLUSION

Firmware emulation of new instructions using existing machine instructions provides an effective way of introducing new functions or features without modifying existing machine hardware. These functions or features are implemented on a higher level than microcode or hardware control points, and provide greater flexibility. This class of firmware is called macrocode and the instruction emulation is called fast assist.

The present invention improves instruction emulation routines by:

(1) Providing hardware assist mechanisms which perform many of the emulation routine tests, thereby reducing the number of cycles of execution for each emulation routine.

(2) Defining a control technique which can manipulate accesses to program storage, thereby reducing the number of instructions required for each emulation routine.

(3) Providing a mechanism for making any machine instruction have the capability to make storage accesses to program storage as well as emulation storage, thereby reducing the number of instructions required for each emulation routine.

The invention has been described with reference to a particular embodiment. Those skilled in the art will recognize that many variations and modifications of the embodiment described can be made that fall within the spirit of the invention. The scope of the invention is meant to be defined by the following claims.

We claim:

1. A data processing apparatus operating under program control in a first state, having a first domain of facilities within the apparatus including first domain storage space, or in a second state having a second domain of facilities within the apparatus including second domain storage space, for processing a sequence of instructions normally in the first state, the sequence of instructions including an instruction that results in a branch to the second state for execution of a program of instructions in the second domain, comprising:

an instruction register, connected to receive instructions in the first and second states, including a plurality of fields, at least one field identifying a location for address information for an operand;

decoding means, responsive to an instruction in the first state, for decoding the instruction to generate a control code, the control code including a branch signal and a domain access activation signal;

means, connected to receive and responsive to the branch signal, for branching program control of the apparatus to the second state to enter the program of instructions in the second domain;

interface means, responsive to the domain access activation signal and the one field in each instruction in the program of instructions, for generating a first domain access signal;

addressing means, in communication with the instruction register, for supplying an address of an operand; and storage means, connected to receive the first domain access signal and the address, for storing operands at locations identified by addresses from the first and second domain storage spaces including means, responsive to the first domain access signal, for translating the address to first domain address space during processing of an instruction in the second state.

2. The apparatus of claim 1, wherein the location identified by the one field is a system general purpose register and the means for generating the first domain access signal includes:

means for determining whether the general purpose register identified by the one field falls within a preselected range of general purpose registers.

3. The apparatus of claim 1, wherein the first state is a user state having access to user domain storage space and the second state is a control state having access to system storage space.

4. The apparatus of claim 1, wherein the program of instructions in the second domain emulates execution of an instruction in the first state.

5. The apparatus of claim 1, wherein the apparatus includes means for generating a program status word for controlling accesses to the storage means and the control code further includes a domain access control signal, further including:

domain access control register means, connected to receive the domain access control signal upon a branch to the second state, for holding the domain access activation signal and the domain access control signal during execution of the program of instructions in the second state;

domain status register means, connected to receive a status indicator from the program status word for the instruction in the first state causing a branch to the second state, for holding the status indicator during execution of the program of instructions in the second state; and wherein the interface means is further in communication with the domain access control register means, the domain status register means and the storage means, for generating storage access control signals during execution of the program of instructions in the second state in response to the status indicator and the domain access control signal.

6. The apparatus of claim 1, wherein the control code further includes a branch test signal, and further including:

means, connected to receive the branch test signal, for testing for program exceptions upon a branch to the second state; and means, responsive to a program exception, for causing a branch to an alternative program of instructions.

7. A data processing apparatus operating under program control in a first state, having a first domain of facilities within the apparatus including first domain storage space, or in a second state, having a second domain of facilities within the apparatus including second domain storage space, for processing a sequence of instructions normally in the first state, the sequence of instructions including an instruction that results in a branch to the second state for execution of a program of instructions in the second domain, comprising:

an instruction register, connected to receive instructions in the first and second states, including a plurality of fields, at least one field identifying a location for address information for an operand;

decoding means, responsive to an instruction in the first state, for decoding the instruction to generate a control code including a branch signal and a domain access control signal;

means, connected to receive and responsive to the branch signal, for branching program control of the apparatus to the second state to enter said program of instructions in the second domain;

domain access control register means, connected to receive the domain access control signal upon a branch to the second state, for holding the domain access control signal during execution of the program of instructions in the second state;

addressing means, in communication with the instruction register, for supplying an address of an operand;

interface means, in communication with the domain access control register means, and the instruction register, for generating at least one access control signal during execution of the program of instructions in response to the domain access control signal and the one field of the instruction;

storage means, connected to receive the address, for storing operands at locations identified by addresses from the first and second domain storage spaces including means, responsive to the access control signal for translating the address.

8. The apparatus of claim 7, wherein the location identified by the one field is a system general purpose register and the interface means includes:

means for determining whether the general purpose register identified by the one field falls within a preselected range of general purpose registers.

9. The apparatus of claim 7, wherein the first state is a user state having access to user domain storage space and the second state is a control state having access to system storage space.

10. The apparatus of claim 7, wherein the program of instructions in the second domain emulates execution of an instruction in the first state.

11. The apparatus of claim 7, wherein the apparatus includes means for generating a program status word for controlling accesses to the storage means, and further including:

domain status register means, connected to receive a status indicator from the program status word for the instruction in the first state causing a branch to the second state, for holding the status indicator during execution of the program of instructions in the second state; and wherein the interface means is further in communication with the domain status register means and responsive to the status indicator for generating the storage access control signals.

12. The apparatus of claim 7, wherein the control code further includes a branch test signal, and further including:

means, connected to receive the branch test signal, for testing for program exceptions upon a branch to the second state; and means, responsive to a program exception, for causing a branch to an alternative program of instructions.

13. A data processing apparatus operating under program control in a user state, having a user domain of facilities within the apparatus including domain storage space, or in a control state, having a system storage space, and having means for generating a program status word in response to execution of instruction for controlling accesses to the domain storage space and the system storage space, for processing a sequence of instructions normally in the user state, the sequence of instructions including an instruction that results in a branch to the control state for execution of an emulation program of instructions in the system storage space, comprising;

an instruction register, connected to receive instructions in the user and control states, including a plurality of fields, at least one field identifying a location for address information for an operand;

decoding means, responsive to an instruction in the user state, for decoding the instruction to generate a control code, the control code including a branch signal and a domain access control signal;

means, connected to receive and responsive to the branch signal, for branching program control of the apparatus to the control state to enter the emulation program;

domain access control register means, connected to receive the domain access control signal upon a branch to the control state, for holding the domain access control signal during execution of the emulation program;

domain status register means, connected to receive a status indicator from the program status word for the instruction in the user state being emulated in the control state, for holding the status indicator during execution of the emulation program; and addressing means, in communication with the instruction register, for supplying an address of an operand;

interface means, in communication with the domain access control register means the domain status register means, for generating at least one access control signal during execution of the emulation program of instructions in response to the status indicator and the domain access control signal;

storage means, connected to receive the access control signal and the address, for storing operands at locations identified by addresses from the user domain storage space and system storage space including means, responsive to the access control signal for translating the address of said operand.

14. The apparatus of claim 13, wherein the interface means further include:

means responsive to the one field of the instruction register and at least a portion of the domain access control signal, for generating a user domain access signal; and means, in communication with the means for translating the address, responsive to the user domain access signal, for interpreting the address as a user domain address.

15. The apparatus of claim 14, wherein the location identified by the one field is a system general purpose register and the means for generating the access control signal includes:

means for determining whether the general purpose register identified by the one field falls within a preselected range of general purpose registers.

16. A data processing apparatus operating under program control in a first state, having a first domain of facilities within the apparatus including first domain storage space, or in a second state having a second domain of facilities within the apparatus including second domain storage space, for processing a sequence of instructions normally in the first state, the sequence of instructions including an instruction that results in a branch to the second state of execution of a program of instructions in the second domain, comprising:

first means, responsive to an instruction in the first state, for generating a plurality of fields, including a control code comprising a branch signal, a domain access activation signal, an address of an operand and at least a first field identifying a location for address information of the operand;

interface means, responsive to the domain access activation signal and the first field in an instruction for generating a first domain access signal; and means coupled to said interface means and the first means, and responsive to the first domain access signal for translating the address to first domain address space during processing of an instruction in the second state.

17. The apparatus of claim 16, wherein the location identified by the first field is a system general purpose register and the means for generating the first domain access signal includes means for determining whether the general purpose register identified by the first field falls within a preselected range of general purpose registers.

18. The apparatus of claim 16, wherein the first state is a user state having access to user domain storage space and the second state is a control state having access to system storage space.

19. The apparatus of claim 16, wherein the program of instructions in the second domain emulates execution of an instruction in the first state.

20. The apparatus of claim 16, wherein the apparatus includes means for generating a program status word for controlling storage access and the control code further includes a domain access control signal, further including:

domain access control register means, connected to receive the domain access control signal upon a branch to the second state, for holding the domain access activation signal and the domain access control signal during execution of the program of instructions in the second state;

domain status register means, connected to receive a status indicator from the program status word for the instruction in the first state causing a branch to the second state, for holding the status indicator during execution of the program of instructions in the second state; and wherein the interface means is further in communication with the domain access control register means, the domain status register means for generating at least one access control signal during execution of the program of instructions in the second state in response to the status indicator and the domain access control signal.

21. The apparatus of claim 16, wherein the control code further includes a branch test signal, and further including:

means, connected to receive the branch test signal, for testing for program exceptions upon a branch to the second state; and means, responsive to a program exception, for causing a branch to an alternative program of instructions.

22. A data processing apparatus operating under program control in a first state, having a first domain of facilities within the apparatus including first domain storage space, or in a second state, having a second domain of facilities within the apparatus including second domain storage space, for processing a sequence of instructions normally in the first state, the sequence of instructions including an instruction that results in a branch to the second state for execution of a program of instructions in the second domain, comprising:

first means, responsive to an instruction in the first state, for generating a plurality of fields, including a control code comprising a branch signal and, a domain access control signal, an address of an operand and at least a first field identifying a location for address information of the operand;

domain access control register means, connected to receive the domain access control signal upon a branch to the second state, for holding the domain access control signal during execution of the program of instructions in the second state;

interface means, in communication with the domain access control register means, and the first means, for generating at least one access control signal during execution of the program of instructions in response to the domain access control signal and the first field of the instruction; and .

storage means coupled to said first means and responsive to the access control signal for translating the address of the operand.

23. The apparatus of claim 22, wherein the location identified by the first field is a system general purpose register and the interface means includes:

means for determining whether the general purpose register identified by the first field falls within a preselected range of general purpose registers.

24. The apparatus of claim 22, wherein the first state is a user state having access to user domain storage space and the second state is a control state having access to system storage space.

25. The apparatus of claim 22, wherein the program of instructions in the second domain emulates execution of an instruction in the first state.

26. The apparatus of claim 22, wherein the apparatus includes means for generating a program status word for controlling accesses to the storage means, and further including:

domain status register means, connected to receive a status indicator from the program status word for the instruction in the first state causing a branch to the second state, for storing the status indicator during execution of the program of instructions in the second state; and wherein the interface means is further in communication with the domain status register means and responsive to the status indicator for generating at least one storage control access signal.

27. The apparatus of claim 22, wherein the control code, further includes a branch test signal, and further including:

means, connected to receive the branch test signal, for testing for program exceptions upon a branch to the second state; and means, responsive to a program exception, for causing a branch to an alternative program of instructions.

28. A data processing apparatus operating under program control in a user state, having a user domain of facilities within the apparatus including domain storage space, or in a control state, having a system storage space, and having means for generating a program status word in response to execution of instruction for controlling accesses to the domain storage space and the system storage space, for processing a sequence of instructions normally in the user state, the sequence of instructions including an instruction that results in a branch to the control state for execution of an emulation program of instructions in the system storage space, comprising:

first means, responsive to an instruction in the user state, for decoding the instruction to generate a plurality of fields, including a control code comprising a domain access control signal, an address of an operand and at least one field identifying a location for address information of the operand;

domain access control register measns, connected to receive the domain access control signal upon a branch to the control state, for holding the domain access control signal during execution of the emulation program;

domain status register means, connected to receive a status indicator from the program status word for the instruction in the user state being emulated in the control state, for holding the status indicator during execution of the emulation program; and interface means, in communication with the domain access control register means, the domain status register means, for generating at least one access control signal during execution of the emulation program of instructions in response to the status indicator and the domain access control signal; and storage means, coupled to said first means and responsive to the access control signal, for translating the address of said operand.

29. The apparatus of claim 28, wherein the interface means further include:

means responsive to the one field of the instruction register and at least a portion of the domain access control signal, for generating a user domain access signal; and means, in communication with the means for translating the address, responsive to the user domain access signal, for interpreting the address as a user domain address.

30. The apparatus of claim 14, wherein the location identified by the one field is a system general purpose register and the means for generating the access control signals includes:

means for determining whether the general purposes register identified by the one field falls within a preselected range of general purpose registers.

* * * * *